US012714166B2

(12) United States Patent
Seok et al.

(10) Patent No.: US 12,714,166 B2
(45) Date of Patent: Aug. 25, 2026

(54) MASK

(71) Applicant: AMOLIFESCIENCE CO., LTD., Seoul (KR)

(72) Inventors: Jeong Su Seok, Seoul (KR); Moon Hoe Kim, Seoul (KR)

(73) Assignee: AMOLIFESCIENCE CO., LTD., Seoul (KR)

( * ) Notice: Subject to any disclaimer, the term of this patent is extended or adjusted under 35 U.S.C. 154(b) by 787 days.

(21) Appl. No.: 17/907,044

(22) PCT Filed: Mar. 9, 2021

(86) PCT No.: PCT/KR2021/002862
§ 371 (c)(1),
(2) Date: Sep. 22, 2022

(87) PCT Pub. No.: WO2021/194129
PCT Pub. Date: Sep. 30, 2021

(65) Prior Publication Data

US 2023/0113123 A1 Apr. 13, 2023

(30) Foreign Application Priority Data

Mar. 26, 2020 (KR) ........................ 10-2020-0036728
Mar. 26, 2020 (KR) ........................ 10-2020-0036729
Mar. 27, 2020 (KR) ........................ 10-2020-0037414

(51) Int. Cl.
*A41D 13/11* (2006.01)
*A62B 18/02* (2006.01)
*A62B 23/02* (2006.01)

(52) U.S. Cl.
CPC ............ *A41D 13/11* (2013.01); *A62B 18/025* (2013.01); *A62B 23/025* (2013.01); *A41D 2500/20* (2013.01)

(58) Field of Classification Search
CPC . A41D 13/1192; A41D 13/11; A41D 13/1115; A41D 13/1107; A41D 13/113;
(Continued)

(56) References Cited

U.S. PATENT DOCUMENTS 3,971,369 A * 7/1976 Aspelin .............. A41D 13/1115 128/206.19
5,720,281 A 2/1998 Allen et al.
(Continued)

FOREIGN PATENT DOCUMENTS

JP 2018035478 A 3/2018
KR 19990008251 A 1/1999
(Continued)

OTHER PUBLICATIONS

Translation of KR-20070025501-A, Cho (Year: 2007).*
(Continued)

*Primary Examiner* — Daniel A Miller
(74) *Attorney, Agent, or Firm* — ROTHWELL, FIGG, ERNST & MANBECK, P.C.

(57) ABSTRACT

A mask is provided. The mask according to one embodiment of the present invention comprises: a first fabric forming an externally exposed surface; a second fabric disposed on one surface of the first fabric to be in close contact with a part of the wearer's face and including a first fiber including a silver wire; and ear bands provided on the opposite ends of the first fabric. Accordingly, the mask including the silver wire can fundamentally prevent the, generation of bacteria by a user's saliva and re-inhalation of proliferated bacteria and has excellent antibacterial performance. In addition, the mask provided with a ply yarn including a silver wire and a general-purpose fiber has excellent washing durability and elasticity and can have the effect of maintaining antibacterial
(Continued)

performance and washing durability even when the silver wire included in the mask is broken.

12 Claims, 5 Drawing Sheets

(58) Field of Classification Search
CPC ............ A41D 2400/34; A41D 2400/36; A41D 2400/52; A41D 2500/10; A41D 2500/20; A62B 23/025; A62B 18/025
USPC .......................................................... 128/863
See application file for complete search history.

(56) References Cited

U.S. PATENT DOCUMENTS

| | | | | |
|---|---|---|---|---|
| 8,549,829 | B2 * | 10/2013 | Song | D02G 3/441 57/238 |
| 2009/0124152 | A1 * | 5/2009 | Lefebvre | D04B 1/16 442/213 |
| 2018/0001244 | A1 | 1/2018 | Zhu et al. | |
| 2018/0117370 | A1 * | 5/2018 | Seo | A62B 23/025 |
| 2019/0001247 | A1 | 1/2019 | Kim et al. | |
| 2020/0063296 | A1 * | 2/2020 | Ozden | D02G 3/441 |

FOREIGN PATENT DOCUMENTS

| | | | | |
|---|---|---|---|---|
| KR | 200417114 | Y1 | 5/2006 | |
| KR | 20070025501 | A | 3/2007 | |
| KR | 20070025501 | A1 * | 3/2007 | A62B 18/025 |
| KR | 20-2009-0010285 | U | 10/2009 | |
| KR | 101061895 | B1 | 9/2011 | |
| KR | 101209848 | B1 | 12/2012 | |
| KR | 101739845 | B1 | 5/2017 | |

OTHER PUBLICATIONS

International Search Report cited in PCT/KR2021/002862 issued Jun. 24, 2021, 6 pgs.
Office Action dated Dec. 20, 2023 issued in corresponding Korean Patent Application No. 10-2020-0037414 and translation (13 pages).

* cited by examiner

[FIG. 1]
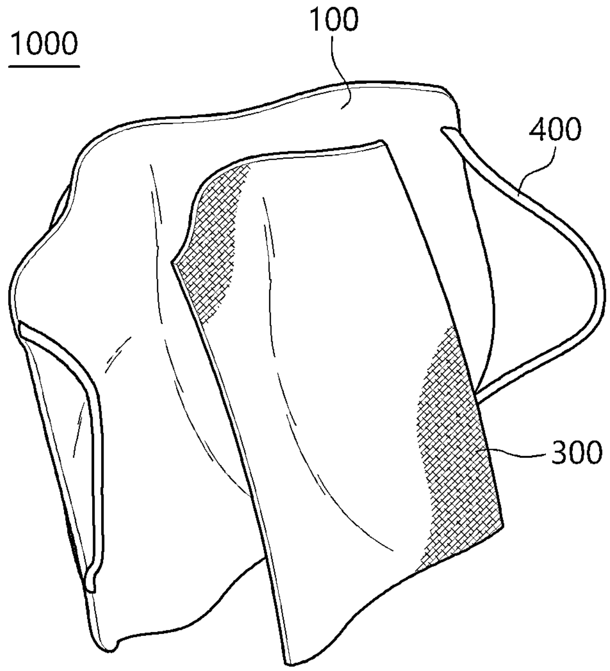
[FIG. 2]
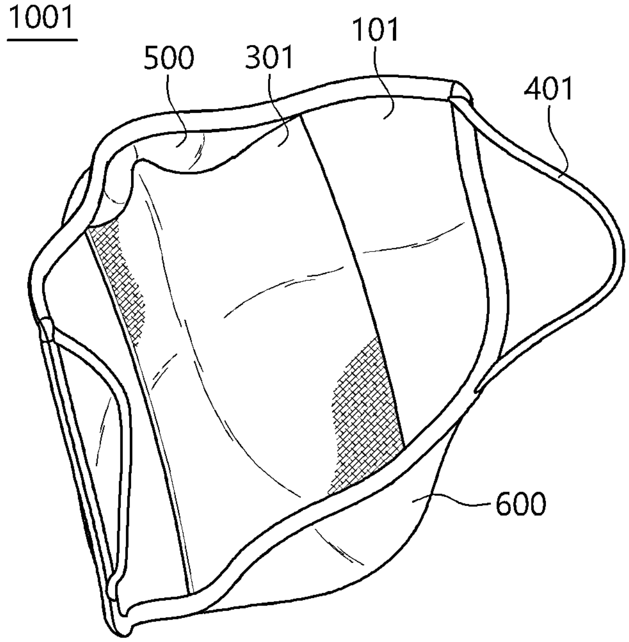

[FIG. 3]
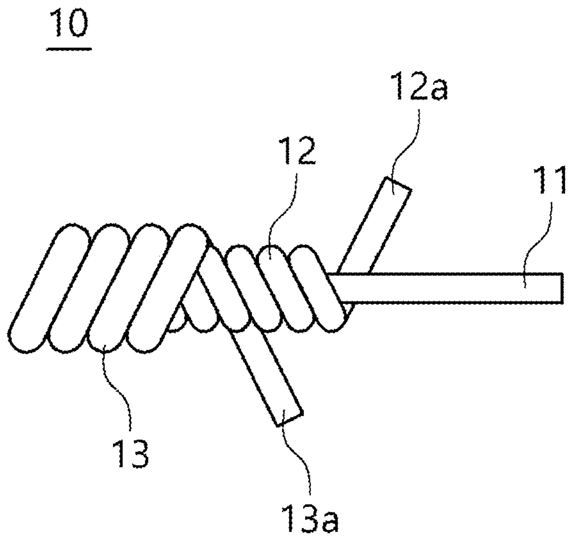
[FIG. 4]
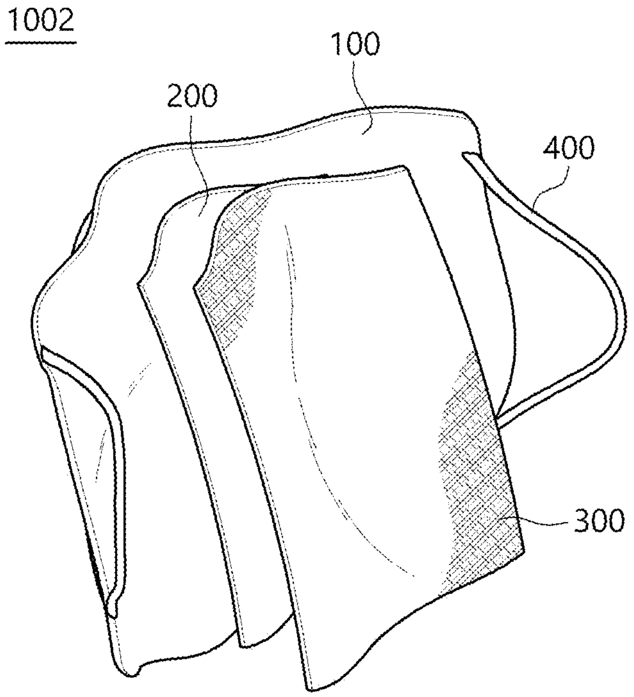

[FIG. 5]
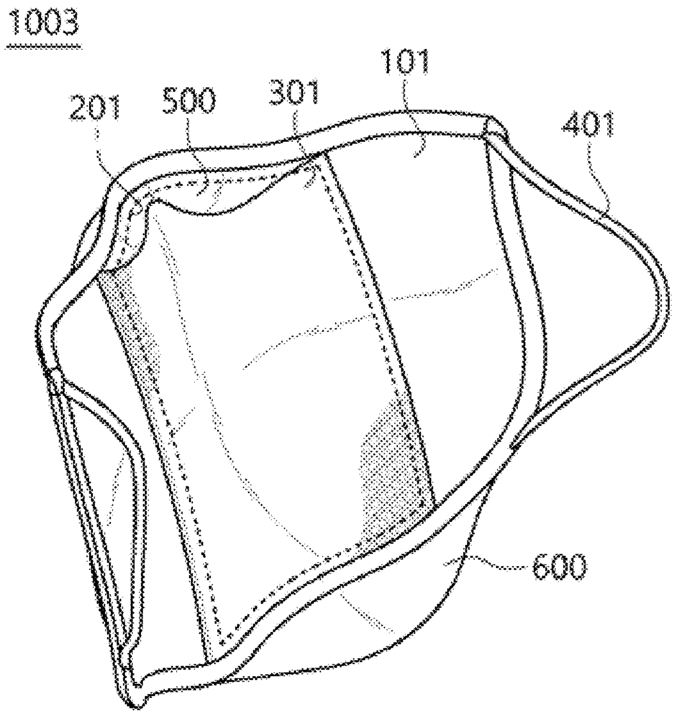
[FIG. 6]
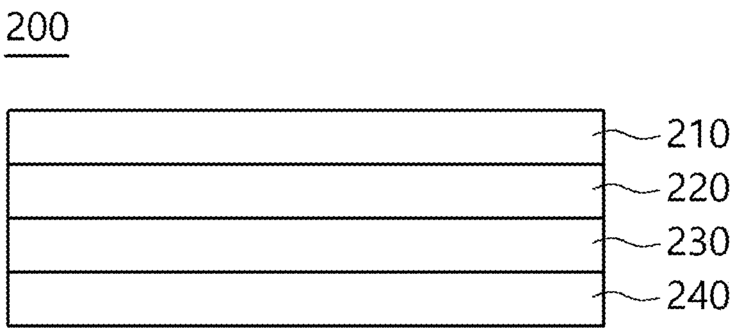

[FIG. 7]
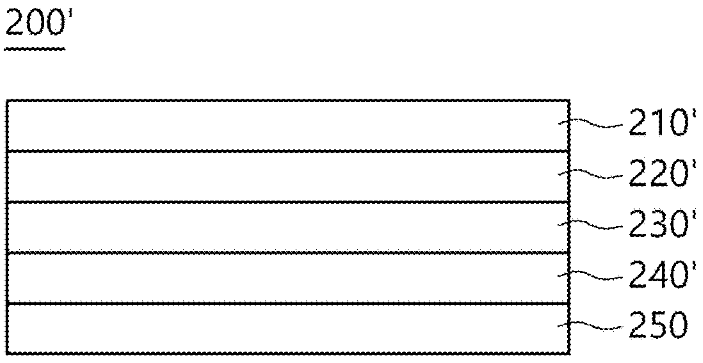
[FIG. 8]
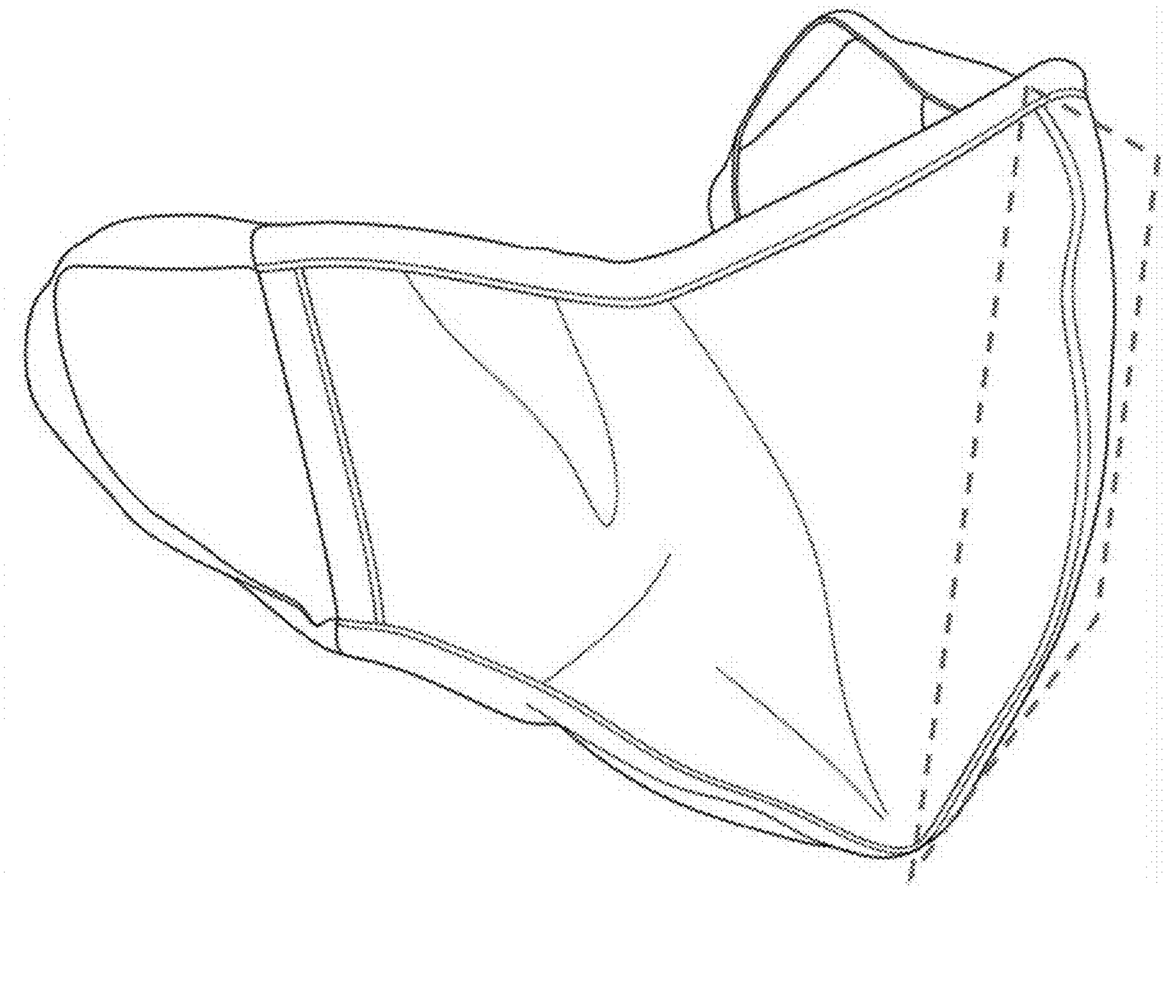

[FIG. 9]
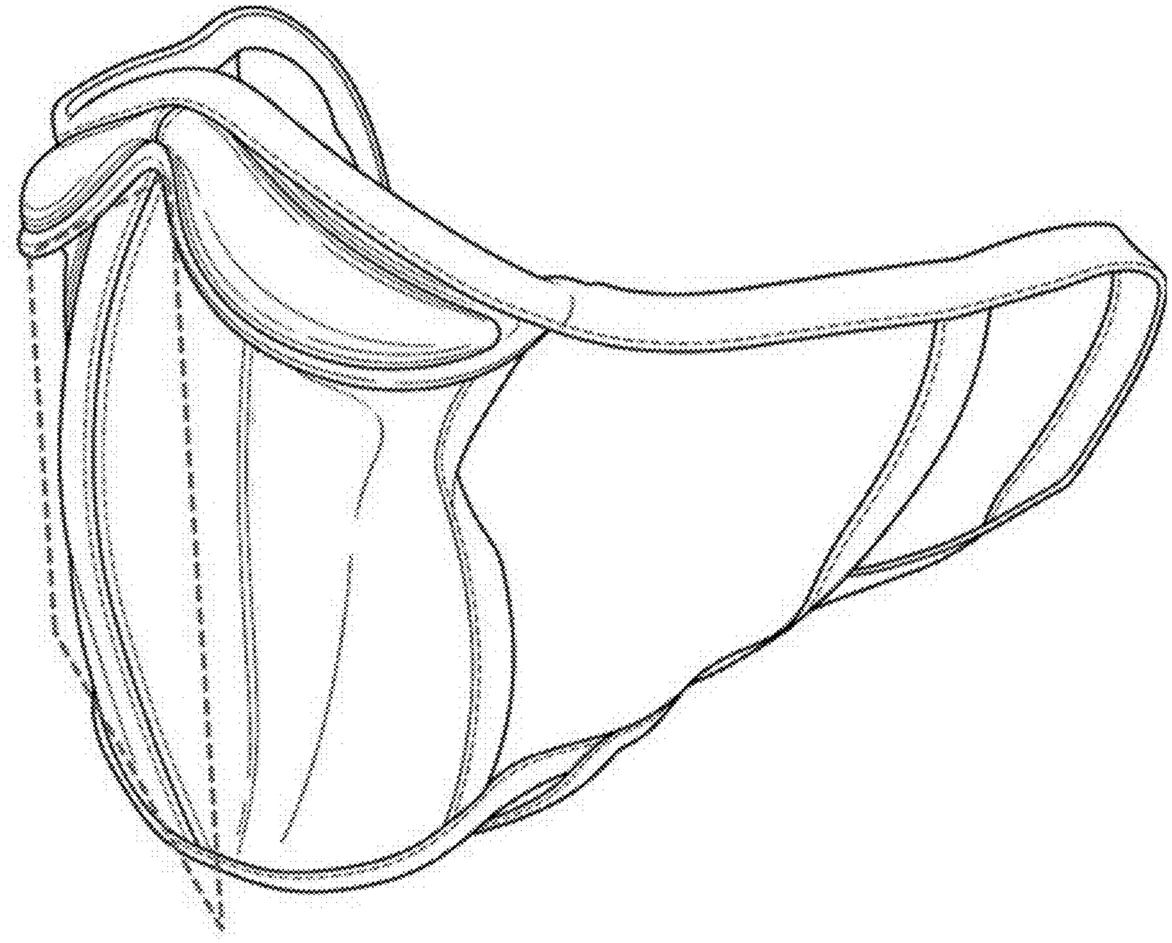

MASK

CROSS REFERENCE TO RELATED APPLICATIONS

This application is a National Phase Entry of International Application No. PCT/KR2021/002862, filed on Mar. 9, 2021, designating the United States, which is based upon and claims priority to Korean Patent Applications 10-2020-0036728 and 10-2020-0036729 both filed on Mar. 26, 2020 and 10-2020-0037414 filed on Mar. 27, 2020, the entire contents of which are incorporated herein by reference.

TECHNICAL FIELD

The present invention relates to a mask.

BACKGROUND

Masks are generally hygienic household items that can block colds or inhalation of airborne dust (dust) and droplets by covering a nose and a mouth.

Meanwhile, conventionally, a mask with an integrated filter has been developed to prevent inhalation of airborne dust (dust) and droplets. In the case of the conventional mask, there was a problem that filtration efficiency could not be exhibited at a desired level, or that it could not be reused after one use even if excellent filtration efficiency was exhibited.

In addition to these dusts in the air, there are countless pathogens such as bacteria, fungi, and viruses that directly harm a human body. When these pathogens are inhaled into the human body through respiration, diseases can be induced, and in particular, the elderly, children, and sick patients with weak immunity are highly likely to have diseases due to the penetration of these pathogens. Moreover, pathogens that can be transmitted through influenza or air cannot be prevented with a general mask.

Accordingly, a mask with antibacterial treatment on the body or an antibacterial mask using an antibacterial fabric or the like is also used. However, a mask with a separate antibacterial treatment has a bad smell, and if worn for a long time, it may cause side effects on the skin or decrease antibacterial durability due to washing.

In addition, if the conventional general mask is worn for a long time, the mask is contaminated with bacteria in the mouth, and the odor in the mouth is not deodorized, so there is a problem that the mask must be frequently replaced with a new mask. That is, there is also a problem that there is no or weak deodorization function.

On the other hand, in general, a silver (Ag) is excellent in sterilization and deodorizing action, and has an excellent blocking effect of electromagnetic waves or geopathic energy. In addition, a silver (Ag) is known to have excellent radiation effects of far-infrared rays including negative ions, and is also known to have excellent antibacterial and anti-fungal actions. In addition, a silver (Ag) is known as one of the essential metals for enhancing immunity in the body. It is known that silver (Ag) ions are easily absorbed by the human body and block the function of enzymes when bacteria or fungi metabolize oxygen, and act as a strong catalyst to kill these pathogens.

Moreover, a silver (Ag) has been widely used as an antidote due to its excellent detoxification action, and it has been used as a silver spoon or silver tableware in the royal court since ancient times because it neutralizes or adsorbs heavy metals and various harmful components and thus discolors.

As for the efficacy of a silver (Ag), It is recorded, in Library of the China Academy of Chinese Medical Science, that "carrying a silver in a human body makes five organs comfortable, stabilizes the mind and body, and expels bad energy and makes the body light to prolong life." According to Donguibogam, "a silver (Ag) is effective in the prevention and treatment of mental disorders such as epilepsy and convulsion, as well as gynecological diseases such as leukorrhea".

Due to the efficacy of a silver, there has been an attempt to apply a silver (Ag) to a mask in the prior art in order to solve the above-mentioned problems.

In particular, as a silver (Ag) nano has become an issue in recent years, many products using a silver nano have been developed. However, in the case of the mask to which a silver nano is applied, the silver nano is detached from the mask body by the user's breathing or physical stimulation and is inhaled into the user's respiratory tract, and the antibacterial performance of the mask is deteriorated due to poor washing durability.

Accordingly, there is an urgent need to develop a mask which can fundamentally prevent the generation of bacteria by the user's saliva and the re-inhalation of proliferated bacteria, exhibit excellent antibacterial performance, washing durability, and elasticity, and exhibit the effect of maintaining antibacterial performance and washing durability even if the silver wire included in the mask is broken.

In addition, it is urgent to develop a mask that has excellent filtration efficiency, can be reused only by replacing a functional media, and has a low moisture absorption rate, which can prevent moisture due to the user's breathing from remaining in the mask body.

SUMMARY OF THE INVENTION

The present invention has been devised to solve the above problems, and the object to be achieved by the present invention is to provide a mask that can fundamentally prevent the generation of bacteria by the user's saliva and the re-inhalation of proliferated bacteria, and exhibit excellent antibacterial performance, washing durability, and elasticity, and exhibit the effect of maintaining antibacterial performance and washing durability even when the silver wire included in the mask is broken.

In addition, another object to be achieved by the present invention is to provide a mask that can have excellent filtration efficiency, can be reused only by replacing a functional media, and can prevent moisture due to the user's breathing from remaining in the mask body as a moisture absorption rate is low.

In order to achieve the above objects, the present invention provides a mask including a first fabric that forms an exposed external surface, a second fabric that is arranged on one surface of the first fabric to be in close contact with a wearer's face, and is formed by including a first fiber including a silver wire, and ear bands that are provided on both sides of the first fabric.

According to an embodiment of the present invention, the first fiber is a ply yarn including a core yarn, a first covering part provided by winding a first covering yarn including the silver wire to surround the core yarn, and a second covering part provided by winding a second covering yarn arranged to surround the first covering part.

In addition, the core yarn and the second covering yarn each may independently include any one or more selected from a natural fiber and a synthetic fiber.

In addition, the core yarn and the second covering yarn each may independently have a fineness of 20 to 100 De.

In addition, the first covering yarn may be twisted with a number of twists of 550 to 1400 TPM, and the second covering yarn may be twisted with a number of twists of 350 to 1100 TPM.

In addition, the silver wire may be a sheath-core fiber including a core including a copper (Cu) and a sheath including a silver (Ag).

In addition, the sheath may have an average thickness of 3 to 3200 nm.

In addition, the silver wire may have an average fiber diameter of 10 to 60 μm.

In addition, the first fabric and the second fabric may be each independently a woven fabric or a knitted fabric.

In addition, the second fabric may be a woven fabric including a warp yarn and a weft yarn, and the warp yarn may include the first fiber, and the weft yarn may include a second fiber.

In addition, the second fiber may include any one or more selected from a natural fiber and a synthetic fiber.

In addition, the mask may include a nose pad that is provided at an upper end of the first fabric; and a chinrest that is provided at a lower end of the first fabric.

In addition, the second fabric may be fixed to at least a portion of the first fabric to form an accommodating part, and the accommodating part may accommodate a functional media.

In addition, the functional media may include a sequentially stacked, porous first support, a porous second support, a nanofiber web formed of a plurality of nanofibers, and a porous third support.

In addition, the functional media may include a third fabric formed by including the first fiber including the silver wire.

Since the mask according to an embodiment of the present invention includes a silver wire, the mask can fundamentally prevent the generation of bacteria due to the user's saliva and the re-inhalation of proliferated bacteria, and can have excellent antibacterial performance. Also, since the mask has a ply yarn including a silver wire and a general-purpose fiber, the mask has excellent washing durability and elasticity, and even if the silver wire included in the mask is broken, the mask can exhibit the effect of maintaining antibacterial performance and washing durability.

In addition, the mask according to another embodiment of the present invention is excellent in filtration efficiency as it is provided with a filter media as a functional media, can be reused only by replacing the functional medium, and as the moisture absorption rate of the mask body is low, the mask can exhibit the effect of preventing moisture due to the user's breathing from remaining in the mask body.

BRIEF DESCRIPTION OF THE DRAWINGS

FIG. 1 is an exploded perspective view of a mask according to an embodiment of the present invention, FIG. 2 is a perspective view of a mask according to an embodiment of the present invention, FIG. 3 is a schematic view showing a ply yarn provided in a mask according to an embodiment of the present invention, FIG. 4 is an exploded perspective view of a mask according to another embodiment of the present invention, FIG. 5 is a perspective view of a mask according to another embodiment of the present invention, FIGS. 6 and 7 are cross-sectional views of a functional media according to another embodiment of the present invention, FIG. 8 is a photograph of a mask according to another embodiment of the present invention, and FIG. 9 is a photograph of an inverted mask according to another embodiment of the present invention.

DETAILED DESCRIPTION

Hereinafter, with reference to the accompanying drawings, embodiments of the present invention will be described in detail so that those of ordinary skill in the art to which the present invention pertains can easily implement them. The present invention may be embodied in many different forms and is not limited to the embodiments described herein. In order to clearly describe the present invention in the drawings, parts irrelevant to the description are omitted, and the same reference numerals are added to the same or similar components throughout the specification.

As shown in FIG. 1, a mask 1000 according to an embodiment of the present invention is implemented by including a first fabric 100 forming an externally exposed surface, and a second fabric 300 disposed on one surface of the first fabric 100, and ear bands 400 provided on both side ends of the first fabric. In this case, the second fabric 300 may be formed to include a first fiber including a silver wire.

First, the first fabric 100 will be described.

The first fabric 100 is positioned on an outside of the mask 1000 so as not to directly touch a user's mouth.

In this case, the first fabric 100 may exhibit hydrophobicity, fast dry property, water repellency, etc. in order to prevent the generation and proliferation of bacteria caused by external water, moisture, or user's saliva.

In addition, the first fabric 100 may use, without limitation, a material of a mask outer shell that may be commonly employed in the art, but the first fabric may be preferably formed by including any one or more selected from a natural fiber and a synthetic fiber. It is more advantageous to use polyester as the first fabric in terms of exhibiting hydrophobicity, fast dry property and water repellency.

The natural fiber may use, for example, a fiber made of any one of Korean paper, poly lactic acid (PLA which is a biodegradable fiber), cotton, hemp, wool, and silk. The synthetic fiber may use, for example, a fiber made of any one of nylon, polyester-based fiber, polyvinyl chloride-based fiber, polyacrylonitrile-based fiber, polyamide-based fiber, polyolefin-based fiber, polyurethane-based fiber, and polyfluoroethylene-based fiber.

Furthermore, as the synthetic fiber, a fiber obtained by using the following polymers can be used.

- Polyethylene-based resin, for example, low-density polyethylene resin (LDPE), ultra-low-density polyethylene (LLDPE) resin, high-density polyethylene (HDPE), ethylene-vinyl acetate (EVA) resin, copolymer thereof, etc.
- Polystyrene-based resin, for example, HIPS, GPPS, SAN, etc.
- Polypropylene-based resin, for example, HOMO PP, RANDOM PP, and copolymer thereof
- Transparent or general acrylonitrile-butadiene-styrene (ABS) terpolymer
- Rigid PVC
- Engineering plastic, for example, nylon, PRT, PET, POM (acetal), PC, urethane, powder resin, PMMA, PES, etc.

In addition, as the natural fiber or synthetic fiber, it is also possible to use other well-known fibers in addition to the above-described fiber materials.

Meanwhile, the first fabric 100 may be a woven fabric or knitted fabric manufactured by weaving or knitting.

First, the structure of the woven fabric may be made by any one method selected from the group consisting of plain weave, twill weave, satin weave, and double weave.

When the plain weave, the twill weave, and the satin weave are referred to as three-way weaving, the particular weaving method of each of the three-way weave is based on a commonly employed weaving method, and the fabric can be changed by modifying the structure based on the three-way weave or by mixing several weaves. For example, a derivative plain weave includes a duduk weave, a basket weave, etc., and a derivative twill weave includes a new twill weave, a broken twill weave, a skip twill weave, a pointed twill weave, etc., and a derivative satin weave includes an irregular satin weave, a double satin weave, an extended satin weave, an ottomeal satin weave, etc.

The double weave is a weaving method of a fabric in which either one of warp and weft yarns is double or both are double, and a particular method may be a conventional double weaving method.

However, the present invention is not limited to the substrate of the above fabric weaves, and the densities of warp and weft yarns in weaving are not particularly limited.

Preferably, the knitting may be performed by a method of weft knitting or warp knitting, and the particular method of knitting the weft and warp knitting may be a commonly employed knitting method of weft knitting or warp knitting.

Specifically, a weft knitted product such as a plain knit, a rib knit, a rib knit, etc. may be manufactured through the weft knitting, and a warp knitted product such as tricot, milanese, and raschel may be specifically manufactured through the warp knitting.

Next, the second fabric 300 will be described.

As described above, the second fabric 300 is arranged on one surface of the first fabric 100. In addition, the second fabric 200 may be formed by including the first fiber including a silver wire.

As shown in FIG. 3, the first fiber 10 may be a ply yarn which includes a core yarn 11, a first covering part provided by winding a first covering yarn 12*a* including a silver wire to surround the core yarn 11, and a second covering part 13 provided by winding a second covering yarn 13*a* arranged to surround the first covering part 12.

The core yarn 11 and the second covering yarn 13*a* may use, without limitation, a fiber that can be used to improve the flexibility and elasticity of the fiber. Preferably, the core yarn 11 and the second covering yarn 13*a* may use any one or more selected from a natural fiber and a synthetic fiber. More preferably, a polyester-based fiber may be used.

In addition, the core yarn 11 and the second covering yarn 13*a* may be formed of a mono yarn or a plurality of filaments. Preferably, the core yarn 11 and the second covering yarn 13*a* may be a fiber formed of a plurality of filaments.

In addition, the core yarn 11 and the second covering yarn 13*a* can use, without limitation, any fiber having a fineness that can be commonly employed in the art. The core yarn 11 and the second covering yarn 13*a* each independently may have a fineness of 20 to 100 De, and more preferably, 30 to 75 De. If the fineness of each of the core yarn and the second covering yarn is independently less than 20 De, washing durability and antibacterial performance according to the breakage of the silver wire, and the maintenance of washing durability may decrease, and if the fineness exceeds 100 De, elasticity may decrease.

In addition, the second covering yarn 13*a* may be twisted at a number of twists of 350 to 1100 TPM, and preferably at a number of twists of 450 to 1000 TPM to form the second covering part 13. If the number of twists of the second covering yarn is less than 350 TPM, washing durability and antibacterial performance according to the breakage of the silver wire, and the maintenance of washing durability may decrease. If the number of twists exceeds 1100 TPM, the elasticity and flexibility of the second fabric may decrease, and as the area of the silver wire exposed to the surface decreases, antibacterial performance may decrease relatively.

On the other hand, the first covering yarn 12*a* may include a silver wire as described above, and the silver wire may include a silver alone or may be a sheath-core fiber including a core having a copper (Cu) for excellent flexibility and a sheath having a silver (Ag).

In this case, the silver wire may be formed by including the steps of drawing a copper material to be used as a core to a predetermined diameter, preparing a silver plate for a sheath, integrating the copper material and the silver plate by a cladding process to obtain a double-structured wire in which the silver plate forms a sheath with respect to the copper material, and obtaining the silver wire, which is a sheath-core fiber, by wire-drawing the double-structured wire.

In addition, according to another embodiment of the present invention, the silver wire may be formed by including the steps of drawing a copper material to be used as a core to a predetermined diameter, obtaining a double-structured wire by coating Ag with a uniform thickness on the surface of the copper material through a dipping process in a bath containing a liquid Ag powder solution, and obtaining the silver wire, which is a sheath-core fiber, by wire-drawing the double-structured wire.

In addition, according to another embodiment of the present invention, the silver nanowire may be formed by including the steps of drawing a copper material to be used as a core to a predetermined diameter, plating a silver on the surface of the copper material by a plating method to form a sheath layer to obtain a double-structured wire, and obtaining the silver wire, which is a sheath-core fiber, by wire-drawing the double-structured wire.

Meanwhile, the sheath may have an average thickness of 3 to 3200 nm, and preferably, an average thickness of 5 to 3000 nm. If the average thickness of the sheath is less than 3 nm, as the copper, which is the central metal, is easily exposed to the outside, the intrinsic functional properties of silver may be deteriorated, and the silver may be detached from the silver wire and inhaled into the user's respiratory tract. If the average thickness exceeds 3200 nm, the flexibility of the silver wire may decrease.

In addition, the silver wire may include 0.1 to 15% by weight of copper, preferably 0.1 to 10% by weight of copper, and the balance of silver. If the copper content is less than 0.1% by weight, the flexibility of the silver wire may decrease, and if the copper content exceeds 15% by weight, antibacterial performance may decrease relatively.

In addition, the silver wire may have an average fiber diameter of 10 to 60 μm, and preferably, an average fiber diameter of 15 to 55 μm. In addition, the fineness of the silver nanowire may be 40 to 150 De, preferably 60 to 120 De. If the average fiber diameter of the silver wire is less than the range or the fineness is less than the range, the desired level of antibacterial effect may not be exhibited, and if the average fiber diameter of the silver wire exceeds the range or the fineness exceeds the range, the flexibility of the silver wire may decrease.

The first covering yarn 12*a* may be twisted at a number of twists of 550 to 1400 TPM, preferably at a number of twists of 650 to 1300 TPM to form the first covering part 12. If the number of twists of the first covering yarn is less than 550 TPM, a desired level of antibacterial performance cannot be exhibited, and if the number of twists exceeds 1400 TPM, the elasticity and flexibility of the second fabric may decrease.

Further, according to another embodiment of the present invention, the first fiber may have a structure including a core yarn having a silver wire and a first covering part provided by winding a first covering yarn to surround the core yarn. In this case, the descriptions of the core yarn and first covering yarn are the same as the descriptions of the first covering yarn 12*a* and second covering yarn 13*a*, respectively, and thus their descriptions will be omitted.

In addition, according to another embodiment of the present invention, the first fiber may be a structure including a core yarn in which a first core yarn and a second core yarn having a silver wire are twisted, and a first covering part provided by winding a first covering yarn to surround the core yarn. In this case, the descriptions of the first core yarn, the second core yarn, and the first covering yarn are the same as the descriptions of the core yarn 11, the first covering yarn 12*a*, and the second covering yarn 13*a*, respectively, and thus, their descriptions will be omitted.

Meanwhile, the first covering yarn 12*a* may be twisted in a direction opposite to that of the second covering yarn 13*a*. For example, if the first covering yarn 12*a* is a left handed twist (Z twist), the second covering yarn 13*a* may be a right handed twist (S twist), and if the first covering yarn 12*a* is a right handed twist (S twist), the second covering yarn 13*a* may be a left handed twist (Z twist). Through this, there is an effect that the first covering yarn 12*a* and the second covering yarn 13*a* are more firmly provided while the flexibility of the first fiber 10 is excellent.

If the first covering yarn 12*a* and the second covering yarn 13*a* are twisted in the same direction, the first covering yarn 12*a* and the second covering yarn 13*a* are not relatively strong, so, after the fabric is woven, if any one of the first covering part 12 and the second covering part 13 is damaged, a problem in which the yarn is unwound in one direction may occur.

The first fiber 10 may have a total fineness of 100 to 400 De, preferably 130 to 370 De. If the total fineness of the first fiber is less than 100 De, antibacterial performance may decrease, washing durability and elasticity may decrease, and if the total fineness exceeds 400 De, flexibility may decrease.

Meanwhile, the second fabric 300 may be a woven fabric or knitted fabric manufactured by weaving or knitting.

According to an embodiment of the present invention, the second fabric 200 may be a fabric including warp and weft yarns, and the warp yarn may include the first fiber 10, and the weft yarn may include the second fiber. Alternatively, the weft yarn may include the first fiber 10, and the warp yarn may include the second fiber.

In this case, the second fiber may use, without limitation, any fiber commonly employed in the art. Preferably, the second fiber may use any one or more selected from a natural fiber and a synthetic fiber, and more preferably a polyester-based fiber may be used as the second fiber.

The first fiber 10 provided in the second fabric 300 may have an arrangement width in the fabric of 0.01 to 12 mm, preferably 1 to 7 mm, and more preferably 3 to 6 mm. If the arrangement width in the second fabric of the first fiber is less than 0.01 mm, the flexibility of the fabric may decrease, and if the arrangement width exceeds 12 mm, the desired level of antibacterial performance may not be exhibited.

Meanwhile, the second fabric 300 may be a mesh formed of the first fiber 10 described above. In this case, the number of meshes of the second fabric 300 may be 40 to 450 meshes, and preferably 50 to 400 meshes. If the number of meshes of the second fabric is less than 40 meshes, antibacterial performance and mechanical property of the second fabric may decrease, and if the number of meshes of the second fabric exceeds 400 meshes, flexibility may decrease.

In addition, as shown in FIGS. 1 and 2, the mask 1000, 1001 according to the present invention may include the second fabric 300, 301 in a relatively small area compared to the area of the first fabric 100, 101. Preferably, the second fabric 300, 301 may be provided with a predetermined area that can cover in close contact with the wearer's nose and mouth.

In addition, the mask 1000 according to the present invention includes the ear bands 400 provided at both side ends of the first fabric 100. Since the ear bands 400 have the same material and shape as known ear bands, the material and shape of the ear bands are not particularly limited in the present invention.

On the other hand, as shown in FIG. 2, the mask 1001 according to the present invention may further include a nose pad 500 provided at the upper end of the first fabric 101 and a chinrest 600 provided at the lower end of the first fabric 101.

The nose pad 500 serves to prevent the inflow of outside air and the exhaust of inside air in areas other than the first fabric 101 and the second fabric 301 when the user breathes, and may have the same material and shape as a known nose pad, and thus, the material and shape of the nose pad are not particularly limited in the present invention. In addition, since the chinrest 600 may have the same material and shape as a known chinrest, the material and shape of the chinrest are not particularly limited in the present invention.

On the other hand, a mask 1003 according to another embodiment of the present invention is implemented by including the first fabric 100 forming an exposed external surface as shown in FIG. 4, and the second fabric 300 fixed to a portion of the first fabric 100 to form an accommodating part and in close contact with the wearer's face, the functional media 200 accommodated in the accommodating part, and the ear bands 400 provided at both ends of the first fabric 100.

In this case, the first fabric 100 is the same as described above, and as shown in FIG. 8, the first fabric 100 may further include a first sewing part extending from the upper end to lower end of the first fabric. By including the first sewing part, it is possible to secure the inner space of the mask, and to further improve wearing comfort.

In this case, the first sewing part may be formed through the adjustment of the vertical length of the first fabric and through a sewing line using a known fiber, or through the adjustment of the vertical length of the first fabric and the adjustment of the material thickness of a first sewing part forming area and through a sewing line, but is not limited thereto.

Next, as described above, the second fabric 300 is fixed to at least a portion of the first fabric 100 to form the accommodating part, and is in close contact with the wearer's face.

In this case, preferably, the upper and lower ends of the second fabric 300 are fixed to the first fabric 100 to form the accommodating part.

The second fabric 300 may exhibit hydrophobicity, fast dry property, water repellency, etc. in order to prevent the generation and proliferation of bacteria caused by external water or moisture or user's saliva.

In addition, the second fabric 300 can use, without limitation, a material of the mask shell that can be commonly employed in the art. Preferably, the second fabric may be formed by including any one or more selected from a natural fiber and a synthetic fiber. More preferably, it is more advantageous to use polyester in terms of exhibiting hydrophobicity, fast dry property, and water repellency.

In addition, the second fabric 300 may be a woven fabric or knitted fabric manufactured by weaving or knitting.

On the other hand, as shown in FIGS. 4 and 5, the mask 1000, 1001 according to the present invention may include the second fabric 300, 301 in a relatively small area compared to the area of the first fabric 100, 101. Preferably, the second fabric 300, 301 may be provided with a predetermined area that can cover in close contact with the wearer's nose and mouth. In addition, the masks 1000, 1001 according to the present invention may include a functional media 200, 201 to be described later in a relatively small area compared to the area of the first fabric 100, 101. In addition, the functional media 200, 201 may be provided in a smaller area compared to the area of the second fabric 300, 301, but is not limited thereto.

Meanwhile, as shown in FIG. 9, the second fabric 300 may further include a second sewing part extending from the upper end to lower end of the second fabric. By including the second sewing part, it is possible to further secure the inner space of the mask, and to further improve wearing comfort.

In this case, the second sewing part is formed through the adjustment of the vertical length of the second fabric and through a sewing line using a known fiber, or through the adjustment of the vertical length of the second fabric and through the adjustment of the material thickness of a second sewing part forming area and through a sewing line, or through the adjustment of the vertical length of the second fabric and through a reinforcing wire. Preferably, forming the second sewing part through the adjustment of the vertical length of the second fabric and through the reinforcing wire may be advantageous in terms of further securing the inner space of the mask and further improving wearing comfort.

The reinforcing wire may use, without limitation, a material capable of exhibiting a predetermined mechanical property so as to maintain the shape of the second sewing part. Preferably, the reinforcing wire may use a plastic member or a metal member. More preferably, using the metal member as the reinforcing wire may be very advantageous in terms of further securing the inner space of the mask, further improving wearing comfort, and securing the inner surface and maintaining wearing comfort even after being washed.

Next, the functional media 200 will be described.

The functional media 200 may be, as shown in FIG. 6, a filter media including a sequentially stacked, porous first support 210, a porous second support 220, a nanofiber web 230 formed of a plurality of nanofibers, and a porous third support 240.

The first support 210 supports the filter media and selectively performs a function of imparting and/or improving water/oil repellency. In this case, the first support 210 may preferably be a nonwoven fabric, and more preferably a chemical bond nonwoven fabric, a thermal bond nonwoven fabric, a dry nonwoven fabric or wet nonwoven fabric such as an airlay nonwoven, a spunlace nonwoven fabric, a needle punching nonwoven fabric, a spunbond nonwoven fabric, or a meltblown nonwoven fabric, and more preferably a spunbond nonwoven fabric.

On the other hand, the first support 210 may use a synthetic polymer component selected from the group consisting of polyester-based polymer, polyurethane-based polymer, polyolefin-based polymer, and polyamide-based polymer; or a natural polymer component including cellulose-based polymer.

In addition, the first support 210 may be a water/oil repellency spunbond non-woven fabric that is implemented by spinning a spinning solution containing a water/oil repellent agent together with the above-described polymer to impart water/oil repellency or through a predetermined water/oil repellency treatment.

In addition, the first support 210 may be formed of a plurality of fibers having a predetermined average fiber diameter. If the average fiber diameter of the fibers forming the first support is excessively low, air permeability may decrease and pressure loss may increase, and if the average fiber diameter of the fibers forming the first support is excessively high, water/oil repellency may decrease or filtration efficiency may decrease.

In addition, the first support 210 may have a predetermined basis weight. If the basis weight of the first support is excessively low, filtration efficiency may decrease as a deviation increases, or uniform filtration efficiency may not be exhibited, water/oil repellency may decrease. If the basis weight of the first support is excessively high, air permeability may decrease, and pressure loss may increase.

The second support 220 is to improve the filtration efficiency of the filter media, at least a portion of the second support 220 may be electrostatically treated. In this case, the second support 220 may preferably be a nonwoven fabric, and more preferably a chemical bond nonwoven fabric, a thermal bond nonwoven fabric, a dry nonwoven fabric or wet nonwoven fabric such as an airlay nonwoven fabric, a spunlace nonwoven fabric, a needle punching nonwoven fabric, or a meltblown nonwoven fabric, and even more preferably a meltblown nonwoven fabric. As the meltblown nonwoven fabric may be a known meltblown nonwoven fabric, it is not particularly limited in the present invention.

On the other hand, the second support 220 may use a synthetic polymer component selected from the group consisting of polyester-based polymer, polyurethane-based polymer, polyolefin-based polymer, and polyamide-based polymer; or a natural polymer component including cellulose-based polymer.

In addition, the second support 220 may be formed of fibers having a predetermined average diameter. If the average diameter of the fiber is excessively small, air permeability may decrease, pressure loss may increase, and if the average diameter of the fiber is excessively large, filtration efficiency may decrease.

In addition, the second support 220 may have a predetermined average pore diameter. If the average pore diameter of the second support is excessively small, air permeability may decrease, pressure loss may increase, and if the average pore diameter is excessively large, filtration efficiency may decrease.

In addition, the second support 220 may exhibit a predetermined basis weight. If the basis weight of the second support is excessively low, filtration efficiency may decrease due to an increased deviation, or uniform filtration efficiency may not be exhibited. If the basis weight of the second support is excessively large, air permeability may decrease, pressure loss may increase.

The nanofiber web 230 is responsible for the physical filtration of a fluid to be treated, preferably the air to be treated, and may have a three-dimensional network structure formed by randomly stacking a plurality of nanofibers three-dimensionally.

In addition, the nanofiber web 230 is a water/oil repellency nanofiber web, and the water/oil repellency nanofiber web is formed by coating a water/oil repellent agent on the surface of the nanofiber web, or by spinning a spinning solution containing a polymer resin and a water/oil repellent agent. Forming the nanofiber web by preferably spinning a spinning solution containing a polymer resin and a water/oil repellent agent may be more advantageous for application in outdoor environments, and in terms of excellent water/oil repellency as well as air permeability and filtration efficiency.

As the polymer resin, a polymer resin that can be commonly employed to form nanofibers in the art may be used without limitation. The polymer resin may preferably include a fluorine-based compound, and more preferably any one or more compounds selected from the group consisting of a polytetrafluoroethylene (PTFE)-based compound, tetrafluoroethylene-perfluoroalkyl vinyl ether copolymer (PFA)-based compound, tetrafluoroethylene-hexafluoropropylene copolymer (FEP)-based compound, tetrafluoroethylene-hexafluoropropylene-perfluoroalkyl vinyl ether copolymer (EPE)-based compound, tetrafluoroethylene-ethylene copolymer (ETFE)-based compound, polychlorotrifluoroethylene (PCTFE)-based compound, chlorotrifluoroethylene-ethylene copolymer (ECTFE)-based compound, and polyvinylidene fluoride (PVDF)-based compound, and more preferably polyvinylidene fluoride (PVDF). In this case, if the polymer resin includes PVD, the weight average molecular weight of the PVDF may be 10,000 to 1,000,000, preferably 300,000 to 600,000, but is not limited thereto.

In addition, as the water/oil repellent agent, any water/oil repellent agent that can be commonly employed in the art may be used without limitation. The water/oil repellent agent may be preferably a solvent type water/oil repellent agent, and more preferably a fluorine-based solvent type water/oil repellent agent.

In addition, the plurality of nanofibers forming the nanofiber web 230 may have a predetermined average fiber diameter. If the average fiber diameter of the nanofibers is excessively low, air permeability may decrease and pressure loss may increase, and if the average fiber diameter is excessively high, filtration efficiency may decrease, and water/oil repellency may decrease.

In addition, the nanofiber web 230 may have a predetermined average pore diameter. If the average pore diameter of the nanofiber web is excessively small, air permeability may decrease and pressure loss may increase, and if the average pore diameter is excessively large, filtration efficiency and water/oil repellency decrease, and the reduction of filtration efficiency may not be prevented.

In addition, the nanofiber web 230 may represent a predetermined basis weight. If the basis weight of the nanofiber web is excessively low, it is not possible to exhibit the desired level of water/oil repellency, and as a deviation increases, filtration efficiency may decrease or uniform filtration efficiency may not be exhibited. If the basis weight is excessively large, air permeability may decrease, pressure loss may increase, and a filtration area may decrease due to the adhesion between acids when implementing a composite filter.

On the other hand, the functional media 200, which is a filter media of the present invention, includes the above-described second support 220 and the nanofiber web 230. Accordingly, even if the efficiency of the electrostatically treated second support 220 decreases, it is possible to prevent a decrease in the filtration efficiency because the nanofiber web 230 is included.

In case that the third support 240 is adhered to the nanofiber web 230 and a fourth support 250 to be described later is further included on one surface of the third support 240', as shown in FIG. 7, the third support 240 may serve to adhere the nanofiber web and the fourth support, and may be preferably a nonwoven fabric, and more preferably a chemical bond nonwoven fabric, a thermal bond nonwoven fabric, a dry nonwoven fabric or wet nonwoven fabric such as an airlay nonwoven fabric, a spunlace nonwoven fabric, a needle punched nonwoven fabric, or a meltblown nonwoven fabric, and more preferably a thermal bond nonwoven fabric.

On the other hand, the third support 240 may use a synthetic polymer component selected from the group consisting of polyester-based polymer, polyurethane-based polymer, polyolefin-based polymer and polyamide-based polymer, or a natural polymer component including cellulose-based polymer.

In addition, as another example, the third support 240 may be made of a composite fiber including a low-melting component. The composite fiber may include a support component and a low-melting component in which at least a portion of the low-melting component is arranged to be exposed to the outer surface. For example, the composite fiber may be a sheath-core type composite fiber in which a support component forms a core part and a low-melting component forms a sheath part surrounding the core part, or a side-by-side composite fiber in which a low-melting component is arranged on one side of the support component. As described above, the low-melting component and the support component may be preferably polyolefin-based in terms of flexibility and elongation of the support. For example, the support component may be polypropylene, and the low-melting component may be polyethylene. However, the present invention is not limited thereto.

In addition, the third support 240 may be formed of fibers having a predetermined average fiber diameter. If the average fiber diameter of the fibers forming the third support is excessively small, air permeability may decrease, pressure loss and interlayer adhesion may decrease. If the average fiber diameter is excessively large, filtration efficiency may decrease.

Also, the third support 240 may have a predetermined average pore diameter. If the average pore diameter of the third support is excessively low, air permeability may decrease and pressure loss may increase, and if the average pore diameter is excessively large, filtration efficiency and interlayer adhesion may decrease.

In addition, the third support 240 may exhibit a predetermined basis weight. If the basis weight of the third support is excessively low, interlayer adhesion may decrease, and if the basis weight is excessively large, air permeability may decrease and pressure loss may increase.

The third support 240 may be provided by being thermally laminated with the nanofiber web 230 described above, thereby further improving interlayer adhesion.

On the other hand, the filter media according to an embodiment of the present invention may further include the fourth support. The fourth support is a porous member and performs a function of reinforcing the filter media such as reinforcing the strength of the filter media or further preventing moisture permeation.

The fourth support may be included in any one of the one surface of the first support, one surface of the third support, and the area between two adjacent members among the first support, the second support, the nanofiber web, and the third support. For example, as shown in FIG. 7, the fourth support 250 may be provided on one surface of the third support 240'.

The fourth support 250 may preferably be a nonwoven fabric, and more preferably a chemical bond nonwoven fabric, a thermal bond nonwoven fabric, a dry nonwoven fabric or wet nonwoven fabric such as an airlay nonwoven fabric, a spunlace nonwoven fabric, a needle punching nonwoven fabric, or a meltblown nonwoven fabric, but is not limited thereto.

In addition, the fourth support 250 may have a relatively small average pore diameter compared to that of the first support 210', the second support 220', the nanofiber web 230' and the third support 240'. However, the present invention is not limited thereto.

Meanwhile, according to another embodiment of the present invention, the functional media 200, 201 may include the third fabric formed by including a first fiber having a silver wire. In this case, the first fiber 10 is the same as described above with reference to FIG. 3.

Meanwhile, the third fabric may be a woven fabric or knitted fabric manufactured by weaving or knitting.

According to an embodiment of the present invention, the third fabric may be a woven fabric including a warp yarn and a weft yarn, the warp yarn may include the first fiber 10, and the weft yarn may include the second fiber. Alternatively, the weft yarn may include the first fiber 10, and the warp yarn may include the second fiber.

In this case, the second fiber may use, without limitation, a fiber commonly employed in the art, and the second fiber may preferably include any one or more selected from a natural fiber and a synthetic fiber, and may more preferably include a polyester-based fiber.

The first fiber 10 provided in the third fabric may have an arrangement width in the fabric of 0.01 to 12 mm, preferably 1 to 7 mm, and more preferably 3 to 6 mm. If the arrangement width of the first fiber in the third fabric is less than 0.01 mm, the flexibility of the fabric may decrease, and if the arrangement width of the first fiber in the third fabric exceeds 12 mm, the desired level of antibacterial performance may not be exhibited.

Meanwhile, the third fabric may be a mesh formed of the first fiber 10 described above. In this case, the number of meshes of the third fabric may be 40 to 450 meshes, and preferably 50 to 400 meshes. If the third fabric has less than 40 meshes, antibacterial performance and mechanical property of the third fabric may decrease, and if the third fabric has meshes exceeding 400, flexibility may decrease.

Meanwhile, according to another embodiment of the present invention, the first fabric 100, 101, the second fabric 300, 301 and the functional media 200, 201 each may be formed by including the first fiber 10 having a silver wire.

In this case, since the material and detailed specification of each of the first fabric 100, 101, the second fabric 300, 301, the functional media 200, 201, and the material and detailed specification of the first fiber having the silver wire are the same as the material and detailed specification of the above-described third fabric and the material and detailed specification of the first fabric having the silver wire, which is included in the third fabric, their descriptions will be omitted.

In addition, the mask 1003 according to the present invention includes ear bands 400 provided at both ends of the first fabric 100. Since the ear bands 400 have the same material and shape as known ear bands, the material and shape of the ear bands are not particularly limited in the present invention.

On the other hand, as shown in FIG. 5, the mask 1004 according to the present invention may further include the nose pad 500 provided at the upper end of the first fabric 101 and the chinrest 600 provided at the lower end of the first fabric 101.

The nose pad 500 serves to prevent the inflow of outside air and the exhaust of inner air in areas other than the first fabric 101 and the second fabric 301 when the user breathes, and may have the same material and shape as a known nose pad, so the material and shape of the nose pad are not particularly limited in the present invention. In addition, since the chinrest 600 may have the same material and shape as a known chinrest, the material and shape of the chinrest are not particularly limited in the present invention.

Although one embodiment of the present invention has been described above, the spirit of the present invention is not limited to the embodiments presented herein, and those skilled in the art who understand the spirit of the present invention may easily suggest other embodiments by adding, changing, deleting, including components within the scope of the same spirit, but this will also fall within the scope of the present invention.

The invention claimed is:

1. A mask comprising:

a first fabric comprising an exposed external surface and an internal surface;

a second fabric arranged on the internal surface of the first fabric, and comprising a first fiber including a silver wire, wherein the silver wire is a sheath-core fiber including a core including a copper (Cu) and a sheath including a silver (Ag); and ear bands that are provided on a left end and a right end of the first fabric, wherein the first fiber is a ply yarn including a core yarn, a first covering part provided by winding a first covering yarn including the silver wire to surround the core yarn, and a second covering part provided by winding a second covering yarn arranged to surround the first covering part, wherein the core yarn and the second covering yarn each independently have a fineness of 20 to 100 De, and wherein the first covering yarn is twisted with a number of twists of 650 to 1300 TPM.

2. The mask according to claim 1, wherein the first fabric and the second fabric are each independently a woven fabric or a knitted fabric.

3. The mask according to claim 2, wherein the second fabric is a woven fabric including a warp yarn and a weft yarn, and the warp yarn includes the first fiber, and the weft yarn includes a second fiber.

4. The mask according to claim 3, wherein the second fiber includes any one or more selected from a natural fiber and a synthetic fiber.

5. The mask according to claim 1, wherein the second fabric is fixed to at least a portion of the first fabric to form an accommodating part, and the accommodating part accommodates a functional media.

6. The mask according to claim 5, wherein the functional media is a filter media including a sequentially stacked, porous first support, a porous second support, a nanofiber web formed of a plurality of nanofibers, and a porous third support.

7. The mask according to claim 5, wherein the functional media includes a third fabric formed by including the first fiber including the silver wire.

8. The mask according to claim 1, wherein the core yarn and the second covering yarn each independently include any one or more selected from a natural fiber and a synthetic fiber.

9. The mask according to claim 1, wherein the second covering yarn is twisted with a number of twists of 350 to 1100 TPM.

10. The mask according to claim 1, wherein the sheath has an average thickness of 3 to 3200 nm.

11. The mask according to claim 1, wherein the silver wire has an average fiber diameter of 10 to 60 μm.

12. The mask according to claim 1, wherein the mask comprises a nose pad that is provided at an upper end of the first fabric; and a chinrest that is provided at a lower end of the first fabric.

* * * * *